July 16, 1946.  A. T. LOGUS  2,404,305
RADIAL RECIPROCATING PISTON DEVICE
Filed Aug. 23, 1943  2 Sheets-Sheet 2

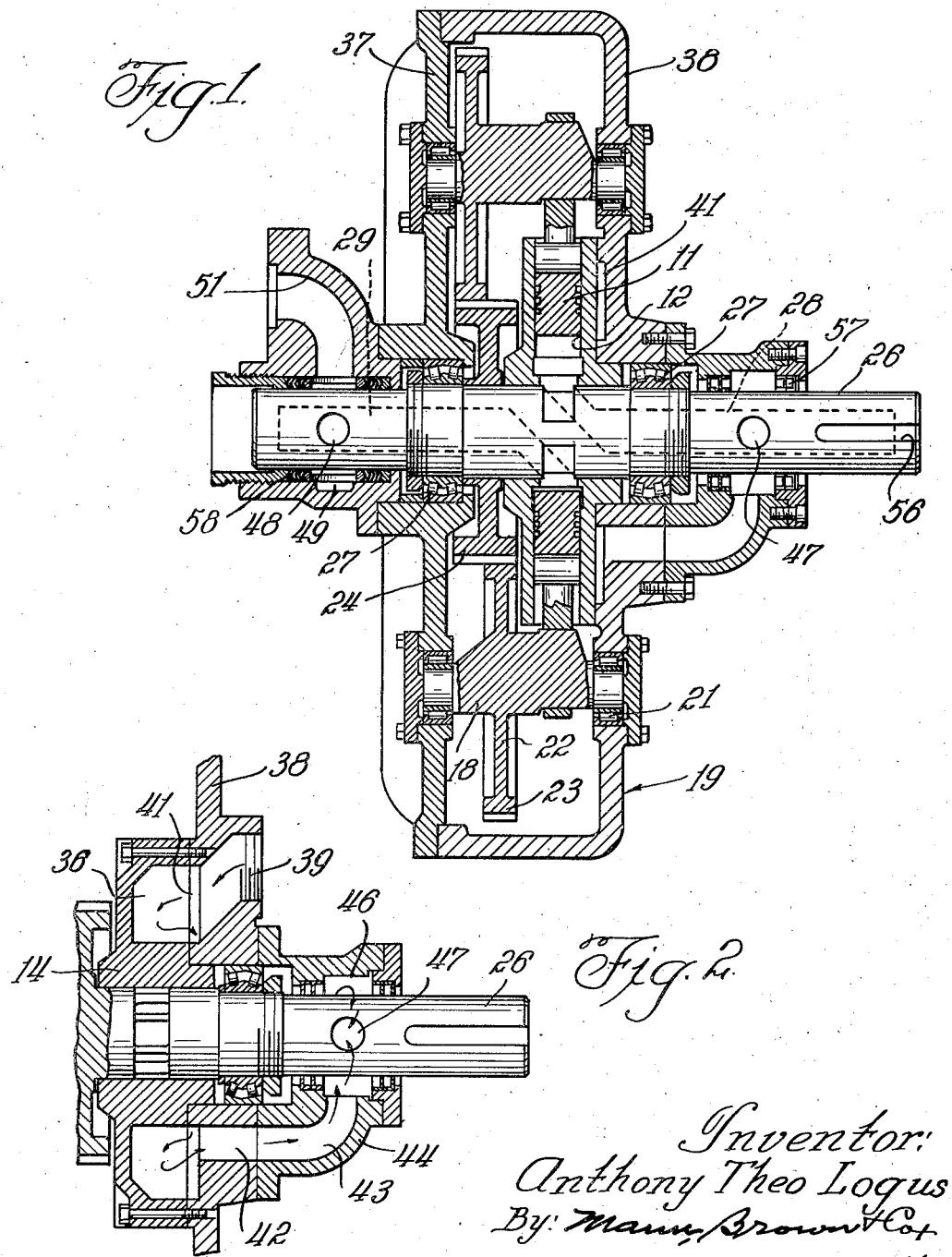

Inventor:
Anthony Theo Logus

Patented July 16, 1946

2,404,305

UNITED STATES PATENT OFFICE 2,404,305

RADIAL RECIPROCATING PISTON DEVICE

Anthony Theo Logus, Cedar Rapids, Iowa

Application August 23, 1943, Serial No. 499,593

5 Claims. (Cl. 103—174)

Persons skilled in the pump art have long recognized advantages in radially arranged reciprocating piston pumps. Not only do they have the advantages of relatively simple production, ease of selling, and the ability to make use of all the highly developed art relating to reciprocating pistons but also their radial arrangement permits the use of common valve means located at the axis about which they are radially arranged. Furthermore, the radial arrangement itself is advantageous from the standpoint of compactness and because of avoiding any long crank shaft with multitudinous bearings.

According to the present invention, a radial reciprocating piston device is provided in which the recognized advantages of such devices are obtained together with further advantages of greater economy and simplicity of manufacture and highly efficient operation. One key factor in making manufacture economical is that there are relatively few parts of different shapes, most of the parts for each cylinder being the same for all of the cylinders or for at least half of them. Furthermore, all of the bearings are of small diameter, thus reducing both manufacturing cost, and frictional moment or torque.

Additional objects and advantages of the invention will be apparent from the following description and from the drawings in which Fig. 1 is a longitudinal sectional view of the form of the invention chosen for illustration, being taken approximately on the line 1—1 of Fig. 3;

Fig. 2 is a fragmentary sectional view taken approximately on the line 2—2 of Fig. 3;

Figure 3:
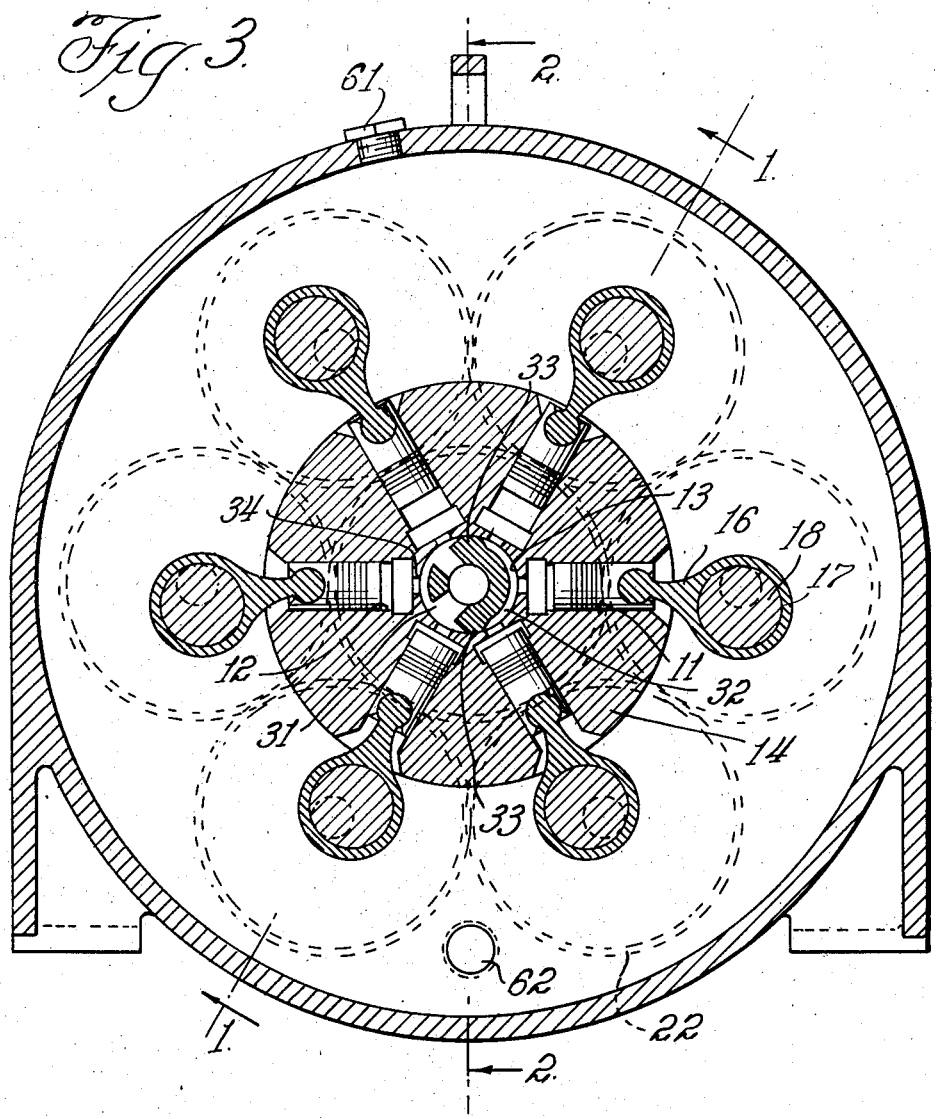
Fig. 3 is a transverse sectional view of the structures shown in Figs. 1 and 2, taken approximately on a radial plane normal to the axis.

A preferred form of the invention has been chosen for illustration and description, in compliance with section 4888 of the Revised Statutes, but persons skilled in the art will readily perceive other means embodying the invention for accomplishing the same results, and the claims are therefore intended to cover the invention as broadly as possible, consistent with the prior art.

As clearly seen in Fig. 1, a plurality of pistons 11 are provided, each operating in a cylinder 12, the cylinders 12 being radially disposed about a bore 13 in a cylinder block 14. The pistons may, if desired, be provided with suitable piston rings as indicated. The pistons, their cylinders and, of course, their piston rings are identical.

All of the pistons are reciprocated by identical pitmans 16 which form connecting rods between the pistons 11 and eccentric surfaces 17 of shafts 18. Each of the shafts 18 is journalled in the housing 19, preferably by means of roller bearings 21. In any event, all of the bearings for the shafts 18 are identical. Each of the shafts 18 is driven by a gear 22 which may be integral with the shafts as shown or may be separately formed and mounted thereon. In any event, the ring portions 23 thereof including the teeth will be identical for all of the shafts. These gear rings have been shown integral with the gears 22 and shafts 18 but they could be made separately if preferred.

The gears 22 mesh with a gear 24 which is carried by and keyed to a shaft 26 which is suitably journalled in housing 19 as by roller bearings 27. It will be observed from Fig. 3 that the gears 22 overlap slightly and hence they are staggered as seen in Fig. 1.

The gear 24 and the gears 22 have the same number of teeth and hence the shaft 26 will rotate in pre-determined relationship with the reciprocating of the pistons 11. The shaft 26 is provided with an intake conduit 28 and a discharge conduit 29. These conduits are provided with ports which are separated by shaft portions 33 which serve as rotating valves to control the inlet to or discharge from the cylinders 12. Each of the cylinders communicates with the bore 13 through a port 34. It will be obvious that each port 34 will communicate with the ports 31 through approximately one-half of the cycle and with the port 32 through approximately the other half of the cycle, the valve portions 33 serving to open the ports 34 first to one of the ports 31 and 32 and then to the other, in timed relation to the reciprocation of the various pistons. Thus as each piston is moving outwardly, its port 34 will communicate with the supply conduit 28 and as each piston is moving inwardly, it will communicate with the discharge conduit 29.

For cooling the cylinders 12, the cylinder block 14 is preferably hollowed out between the cylinders, as shown at 36 in Fig. 2, to form a passage for cooling liquid. Of course this also conserves metal. The adjacent portion of housing 19 preferably forms a jacket so that cooling liquid is supplied to the hollowed-out spaces by cooperation between the cylinder block 14 and the housing 19.

The housing 19 is made up of two portions 37 and 38. The cylinder block 14 is secured to the portion 38 as seen in Fig. 2. The portion 38 is provided with an intake opening 39 to which a supply pipe may be secured. This communicates with one of the hollowed-out spaces 36.

All of the hollowed-out spaces 36 are connected by means of a passage 41 formed in the housing portion 38. Diametrically opposite to the inlet opening 39 is a passage 42 which communicates with the passage 43 in a cap 44. This cap is provided with an annular groove 46 which communicates with the passage 43 and with a port 47 in shaft 26 which in turn communicates with supply conduit 28.

From the foregoing, it is seen that the liquid for which the illustrated device is intended would flow through inlet 39 and through the passages 41 into contact with the various cylinders for cooling them and then it would flow through the passages 42, 43, 46 and port 47 into the supply conduit 28 in the shaft 26 and then into the successive expanding cylinders as the pistons move outwardly therein. In the case of liquids, it is believed that this will have all of the cooling effect necessary, although some people might be surprised that it has a net cooling effect. If desired, still further cooling could be accomplished by connecting a cooling coil between the passage 42 and the annular groove 46.

In the illustrated form, the discharge conduit 29 communicates through a port 48 with an annular groove 49 which in turn communicates with delivery conduit 51 to which may be secured a pipe for conducting the liquid to any desired point.

The shaft 26 is provided with a spline groove 56 for coupling it to any other apparatus in driving relationship.

Although this apparatus can be used as a fluid driven motor, it will probably most often be used as a pump. In either event, suitable rotary sealing means should be provided around the shaft on both sides of the intake port 47 and the discharge port 48. L-type sealing range 57 have been illustrated in one instance and V-type packing rings 58 in the other. The L-type sealing rings have been illustrated as facing the port 47. This is because it is contemplated to use a centrifugal pump for supplying liquid to the illustrated pump under a low pressure. If such centrifugal pump is not used and the liquid is drawn in by the partial vacuum created by the outwardly moving pistons, the sealing rings 57 will probably be faced the other way.

If the device is to be used as a fluid motor, the operation will preferably be reversed, the driving fluid being introduced at 51 under high pressure and pushing half of the pistons outwardly, these pistons causing rotation of the shafts 18 and ultimately of the shaft 26 to drive a suitable load; the fluid being expelled at low pressure by the pistons through the port 47.

The chief use of the device at present contemplated is as an oil pump. The oil will lubricate the pistons, and to some extent, by leakage, other working parts. Wherever necessary special lubricating means may be provided. Excess oil seepage may drain out through aperture 62. Plug 61 may be provided to provide additional lubricant or for flushing purposes.

From the foregoing, it is seen that a very efficient pump has been devised in which manufacturing costs are kept at a minimum by using a small number of different parts or in other words having as many of the parts as possible the same for all of the cylinders. Operating efficiency is high due to the use of a single valve for all of the cylinders and due to avoiding large diameter bearings.

I claim:

1. A radial reciprocating piston device comprising a stationary cylinder block having a bore therethrough and having a plurality of cylinders radially disposed about a bore and having ports through which they communicate with the bore, a drive shaft extending through the bore and having supply and discharge conduits therein, a gear fast on the drive shaft, a gear meshing therewith for each of the pistons, eccentric means connecting each of the pistons with its gear in driving relationship, the phase of each piston in its reciprocatory cycle at a given instant corresponding to its angular position about the shaft, and valve means formed by the shaft in said bore connecting each of said ports with said supply and discharge passages consecutively in correct timing with the reciprocation of the pistons; all of the pistons and cylinders, the eccentrics therefor, the gear rings associated with the eccentrics and the bearings associated with the gear rings being identical.

2. A radial reciprocating piston device comprising a cylinder block having a bore therethrough and having a plurality of cylinders radially disposed about the bore and having ports through which they communicate with the bore, a drive shaft concentric with the bore, a gear fast on the drive shaft, a gear meshing therewith for each of the pistons, eccentric means connecting each of the pistons with its gear in driving relationship, the phase of each piston in its reciprocatory cycle at a given instant corresponding to its angular position about the shaft and valve means in said bore rotating with the shaft and connecting each of said ports with supply and discharge passages consecutively in correct timing with the reciprocation of the pistons; all of the pistons and cylinders, the eccentrics therefor, the gear rings associated with the eccentrics and the bearings associated with the gear rings being identical.

3. A radial reciprocating piston device comprising a stationary cylinder block having a bore therethrough and having a plurality of cylinders radially disposed about the bore and having ports through which they communicate with the bore, a drive shaft extending through the bore and having supply and discharge conduits therein, a gear fast on the drive shaft, a gear meshing therewith for each of the pistons, eccentric means connecting each of the pistons with its gear in driving relationship, the phase of each piston in its reciprocatory cycle at a given instant corresponding to its angular position about the shaft, and valve means formed by the shaft in said bore connecting each of said ports with said supply and discharge passages consecutively in correct timing with the reciprocation of the pistons.

4. A radial reciprocating piston device comprising a cylinder block having a bore therethrough and having a plurality of cylinders radially disposed about the bore and communicating therewith through ports, a drive shaft concentric with the bore, a gear fast on the drive shaft, a gear meshing therewith for each of the pistons, eccentric means connecting each of the pistons with its gear in driving relationship, the phase of each piston in its reciprocatory cycle at a given instant corresponding to its angular position about the shaft and valve means in said bore rotating with the shaft and connecting each of said ports with supply and discharge passages consecutively in correct timing with the reciprocation of the pistons.

5. A radial reciprocating piston pump including a cylinder block having a bore therethrough and a plurality of cylinders radially arranged around the bore and communicating with the bore through ports, a shaft extending through the bore having supply and discharge conduits therein, each having openings axially aligned with the ports and separated by portions of the shaft having a valving fit with the cylinder block which substantially seals the ports on one side thereof from the others, said cylinder block being hollowed out between the cylinders, and a casing surrounding the cylinder block and with it forming conduit means supplying working fluid adjacent to one of the cylinders and forming passage means between the hollowed-out spaces adjacent to all of the cylinders, an annular chamber surrounding the shaft, communicating with said passage, and communicating through a port in the shaft with one of said conduits, said casing and the associated parts being so arranged as to cause the work fluid which is supplied to the cylinders to circulate through the hollowed out spaces and cool said cylinders, and to pass directly between said spaces and the cylinders.

ANTHONY THEO LOGUS.